United States Patent
Heino et al.

[11] Patent Number: 5,160,434
[45] Date of Patent: Nov. 3, 1992

[54] FILTER CYLINDER WITH DRAINAGE SURFACE

[75] Inventors: Jukka Heino; Raimo Kohonen, both of Savonlinna, Finland

[73] Assignee: A. Ahlstrom Corporation, Noormarkku, Finland

[21] Appl. No.: 663,876

[22] PCT Filed: Jun. 26, 1990

[86] PCT No.: PCT/FI90/00168
§ 371 Date: May 1, 1991
§ 102(e) Date: May 1, 1991

[87] PCT Pub. No.: WO91/00767
PCT Pub. Date: Jan. 24, 1991

[30] Foreign Application Priority Data

Jul. 6, 1990 [FI] Finland ............... 893288

[51] Int. Cl.$^5$ ........................... B01D 33/056
[52] U.S. Cl. ........................ 210/391; 210/402
[58] Field of Search ........... 210/402, 404, 406, 400, 210/391

[56] References Cited

U.S. PATENT DOCUMENTS

| | | | |
|---|---|---|---|
| 2,072,586 | 3/1937 | Grant | 210/404 |
| 2,889,931 | 6/1959 | Buttolph | 210/404 |
| 3,014,589 | 12/1961 | Frykhult | 210/404 |
| 3,363,774 | 1/1968 | Luthi | 210/404 |
| 4,168,234 | 9/1979 | Hutto, Jr. | 210/404 |
| 4,370,231 | 1/1983 | LaValley | |
| 4,376,704 | 3/1983 | Otte et al. | 210/404 |
| 4,529,509 | 7/1985 | Nilsson | 210/404 |
| 4,563,278 | 1/1986 | Mutzenberg et al. | 210/402 |
| 4,581,139 | 4/1986 | Kosonen | |
| 4,816,169 | 3/1989 | LaValley | 210/402 |
| 4,931,179 | 6/1990 | Nilsson | 210/404 |

FOREIGN PATENT DOCUMENTS

| | | |
|---|---|---|
| 55538 | 9/1991 | Finland . |
| 1315549 | 9/1970 | United Kingdom . |

Primary Examiner—Mary Lynn Theisen
Assistant Examiner—W. L. Millard
Attorney, Agent, or Firm—Cohen, Pontani, Lieberman & Pavane

[57] ABSTRACT

A drum filter is characterized in that its filtrate compartments (20) comprise a bottom part (28,30) and a side surface (32), which is provided with a lip or curved portion (34) extending towards the inside of the compartment (20) from the edge of the side surface opposite the bottom part. The lip (34) prevents the filtrate from escaping from the compartment (20) back through the wire surface, when the drum filter (20) is rotated.

5 Claims, 1 Drawing Sheet

FILTER CYLINDER WITH DRAINAGE SURFACE

FIELD OF THE INVENTION

The present invention relates to a rotary drum filter for treating pulp, which is especially suitable for treating fiber suspensions in the wood processing industry. The filter drum or cylinder is particularly designed for washing or thickening said suspensions, by filtering liquids from fiber suspensions.

BACKGROUND OF THE INVENTION

The invention relates more specifically to a so called rotary drum filter, the basic construction of which comprises a tank, containing the suspension being thickened and a wire-surfaced cylinder rotatably mounted in the tank. The ends of the drum or cylinder are sealed so as to prevent the cylinder from being filled with suspension. The cylinder has under its wire surface filtrate compartments, into which liquid from the suspension in the tank is pressed due to the hydrostatic pressure, whereby the fibers in the suspension are transferred with the liquid onto the wire surface and are thickened forming a fiber mat thereon. The cylinder in this kind of filter based on hydrostatic pressure can be submerged in the suspension in the tank only slightly below the axial plane of the cylinder. When the cylinder rotates slowly, approximately 1 to 3 rpm, a fiber mat is gradually deposited on the wire surface. The formation speed of the mat naturally depends not only on the thickness of the deposited mat, but also on how deep in the vessel the filtration takes place. The filtration reaches its maximum speed slightly before the bottom dead center, because, at this point, the hydrostatic pressure is close to its maximum and the build-up of a thick mat does not yet disturb the filtration. After the bottom dead center, the formation of the mat slows down, until the formation, of course, ceases completely, when the mat emerges from the suspension.

As the fiber mat emerges from the tank upon rotation of the cylinder the filtration based on gravity begins, liquid flows slowly due to the effect of the gravity through the fiber mat into the filtrate compartments inside the wire surface. The fiber mat is removed from the cylinder at a stage, when it has passed the top dead center of the cylinder and again approaches the surface of the suspension. The mat may be removed either mechanically with scrapers or by injecting either a liquid or compressed air through the wire surface. The liquid which has flowed into the filtrate compartments may be discharged from the apparatus, for example, via the hollow shaft of the apparatus or by utilizing some other arrangement. The length of a filtration cycle based on hydrostatic pressure in an apparatus according to the above description is approximately 140° of a revolution of a cylinder and the proportion of the initial filtration is approximately 30° and the proportion of the vacuum drying (above the liquid surface of the tank) is approximately 100°.

The above-described basic type of a drum filter has been considerably improved over the decades. One significant improvement worth mentioning is the subjecting of the suspension in the tank to a suction applied through the compartments, whereby the filtration of liquid is considerably improved and thus the capacity of the apparatus is significantly increased. Generally, the suction operation is carried out by a suction leg in such a way that each of the filtrate compartments is connected by means of a separate filtrate tube to a valve which is connected to the suction leg and the shaft of the apparatus. The operation of the valve is controlled in such a way that the fiber mat is subjected to suction over a sector of approximately 240°. Approximately 30 filtrate compartments are arranged within the cylinder, each of which compartments has been connected by a separate filtrate tube to the shaft tube of the cylinder surrounding the valve. Since the fiber mat generated this way is significantly more tightly attached to the filtrate surface than the mat generated in a conventional way, the thickened fiber mat must be removed from the filtrate surface by separate means. At this point, it should be noted that the suction leg may be replaced by some other apparatus creating subatmospheric, such as a vacuum pump.

The filtrate compartments in accordance with the prior art have one disadvantage, which occurs particularly in the operation stage of the filter cylinder, when the pulp web is removed from the wire surface of the cylinder. At this point the filter cylinder described in, for example, FI Patent 55538 and the filter compartments therewherein have turned, in the mat removal stage to a position wherein the filtrate still present in the compartments, will flow, in the rotational direction of the cylinder, toward the front wall as it is unable to exit from the compartment, since the discharge openings of the compartment do not usually extend along the entire width of the bottom of the compartment. Consequently, especially when the suction is interrupted and the compartment turns further, the filtrate begins to flow against the wire surface, whereby it, of course, permeates the wire surface and flows back to the tank or to the pulp web to dilute the consistency thereof.

SUMMARY OF THE INVENTION

It has been possible to solve the problems of the prior art apparatuses with the present invention in such a way that by providing the filter cylinder in accordance with the present invention it is possible to remove all liquid from the filter compartment without the risk of the filtrate flowing back to the pulp web.

The filter cylinder in accordance with the present invention is characterized in that the filtrate compartments comprise a bottom part and at least one side wall, the leading side wall of each compartment with respect to the direction of rotation of cylindrical part is provided at its upper edge remote from the bottom part with a curved portion extending towards the inside of the compartment or with a projecting lip or other overhanging portion, which curved portion or lip prevents the filtrate from escaping from the compartment back through the wire surface, when the cylinder is rotated.

BRIEF DESCRIPTION OF THE DRAWINGS

The filter cylinder in accordance with the present invention is described in more detail below, by way of example, with reference to the accompanying drawings, in which.

DETAILED DESCRIPTION OF THE PRESENTLY PREFERRED EMBODIMENT

Figure 1:
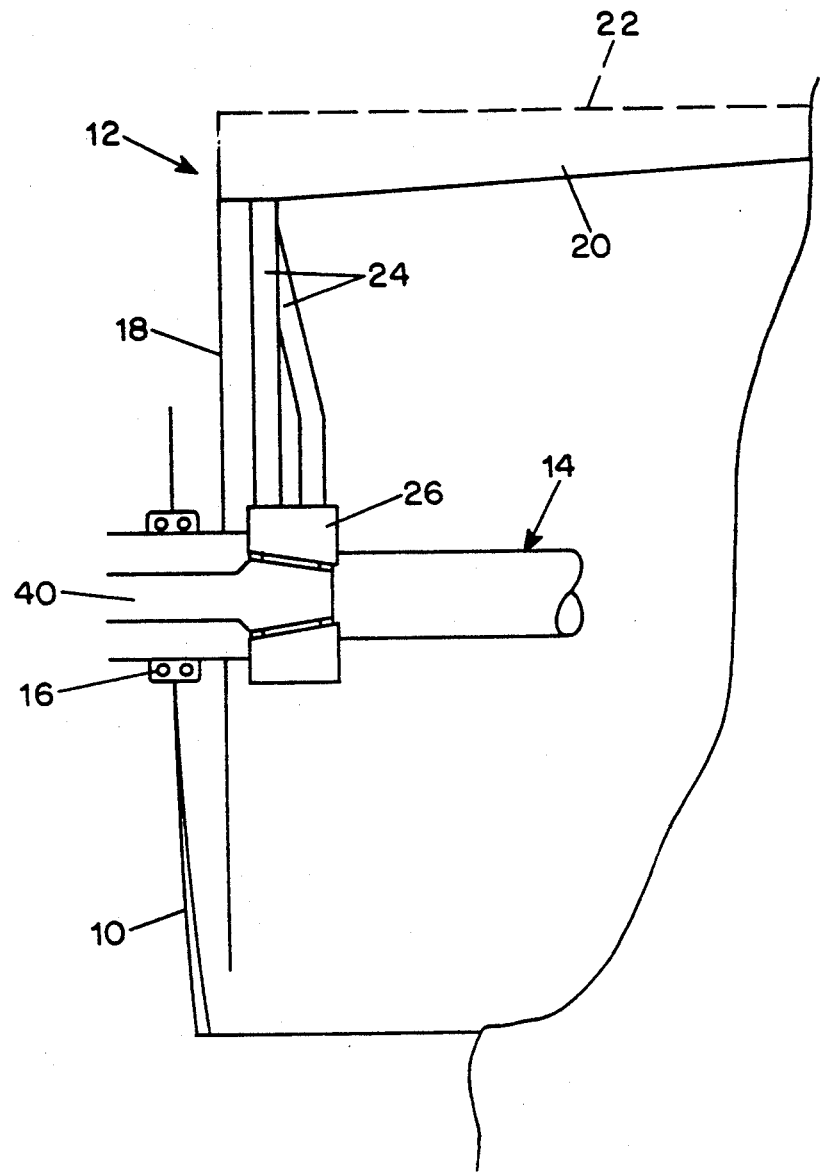
FIG. 1 is an axial sectional view of part of a filtration cylinder in accordance with the present invention.

According to FIG. 1 a filter apparatus mainly comprises a tank 10, which may be either completely open from the top or covered with a hood, and a cylindrical filter cylinder 12, which is arranged on shaft 14, which is mounted at its ends with bearings and seals 16 relative to the tank 10. The body of the filter cylinder 12 comprises end plates 18 attached to an extension of the shaft 14, which plates at the same time prevent entry of the suspension to the inside of the cylinder, and filter compartments 20, by means of which the ends of the cylinder are connected to each other and which form the primary structure of the cylinder. The cover of a filter compartment may be either a perforated plate, on which the wire surface serving as a filter surface is located, or the wire surface 22 itself. If the cover of the filtrate compartment is a perforated plate, it will also serve as a member bearing the stresses of the cylinder. A great number of filtrate compartments 20, approximately 30–40, has been arranged at the periphery of the cylinder. The bottom surfaces (30, 28) of the filtrate compartments 20 are inclined either only towards one end of the cylinder or from the center in both directions towards the opposite ends thereof, mainly along the entire length of the cylinder, which, in most of the cases, is more than 5 meters. Filtrate tubes 24 leading towards the shaft 14 of the cylinder are connected to the bottom surface 28 of the filtrate compartments 20 at the end of the cylinder (or at both ends thereof, when the bottom surfaces of the compartments are inclined towards both ends). Adjacent to the filtrate tubes 24 is a distribution chamber 26, to which the filtrate tubes 24 are connected in either one or two rows mainly according to the diameter of distribution chamber 26. Distribution chamber 26 is mainly required for guiding the filtrate flowing from the filtrate tubes to the suction leg without the need to constrict the sectional area of the flow. In the distribution chamber the sectional area of the flow is changed from the shape of a round filtrate tube to a rectangular one defined by the radial intermediate and end walls of the chamber. A valve apparatus 40 for guiding the filtrates of tubes 24 in a desired manner is located inside the distribution chamber 26. By means of the same valve it is possible, during the operation of a conventional filter, to also conduct liquid or gas for the removal of the fiber mat through filtrate tubes 24 to filtrate compartments 20.

Figure 2:
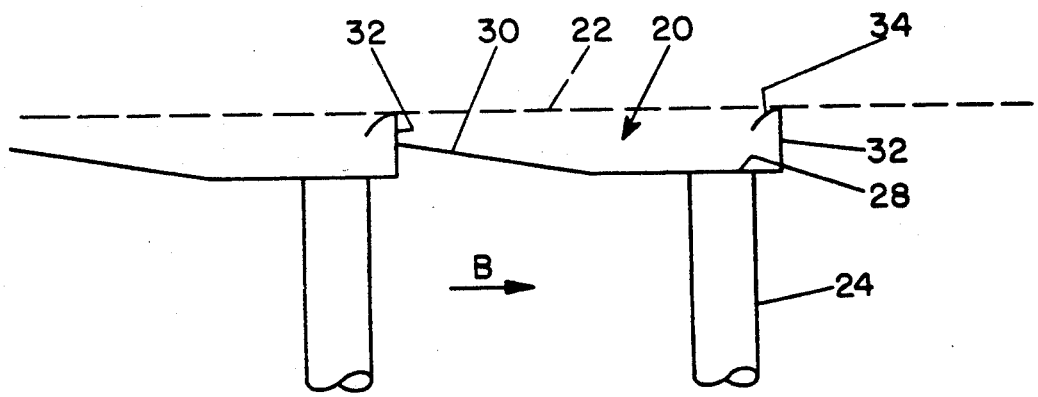
FIG. 2 is an enlarged fragmentary detailed sectional view at a radial level of the filter cylinder in accordance with the present invention.

Filtrate compartment 20 comprises, according to FIG. 2, a bottom part 28 substantially parallel to the periphery of the filter surface, to which part 28 a filtrate tube 24 is connected. An inclined bottom part 30 is joining the edge of the bottom part 28, and extends in the rotational direction (arrow B) of the filter cylinder and advantageously forms an angle of approximately 165° with the bottom part 28. A substantially radial wall 32 is joining the front edge of the bottom part 28 in the rotational direction of the drum filter. The outer edge of wall 32 is provided with an inwardly extending lip or curved portion 34 pointing towards the filtrate compartment, the purpose of which curved portion 34 is to prevent the filtrate in the compartment from escaping through a filter surface 22 back to the fiber mat or, after the mat is removed, to the tank when the cylinder turns to a position, in which the pulp web is removed from the filter surface (rotated approximately 60° downwards and to the right from the position shown in FIG. 2). The bottom part 30 extends upward advantageously to about half the height of wall 32 of the next filtrate compartment. Bottom part 30 is attached to wall 32, for example, by welding. The construction thus produced is very resistant against different stresses it may be subjected to. Additionally, curved portion 34 will strengthen the compartments against bending stresses. Curved portion 34 also forms a suitable location for attachment of filter surface 22.

Curved portion 34 formed in the filtrate compartment 20 will retain inside all of the filtrate which might otherwise drain back to the pulp web during the removal stage of the web. The filtrate will remain in the compartment 20 until the compartment submerges under the surface of the suspension and the filtration based on the hydrostatic pressure begins, at which point the filtrate is either discharged with the air from the filtrate tubes or during the stage when suction is applied.

As it will be appreciated from the above description, it has been possible to eliminate or minimize the defects of the prior art apparatuses by providing an apparatus, which is easy to produce and by means of which the filter cylinder becomes stronger than those of the prior art.

What is claimed is:

1. A filter cylinder rotatable in a tank and including a substantially cylindrical member having an axis and being covered by a filter surface, said filter cylinder comprising a plurality of adjacent axially extending filtrate compartments below said filter surface, each said compartment comprising:
   a bottom part spaced from said filter surface;
   a filtrate impermeable continuous side wall, which, when viewed in the direction of rotation, is a leading sidewall, having an outer edge and extending from said bottom part toward said filter surface and in contact therewith;
   a protrusion extending at an angle relative to said filter surface from said outer edge inwardly toward said bottom part of said compartment, terminating within said compartment; and
   an opening in said bottom part, facing said filter surface, between said leading sidewall of said compartment and a leading sidewall of an adjacent compartment of said filter cylinder.

2. The filter cylinder of claim 1, wherein the leading side wall extends in a substantially radial direction and said bottom part of said filtrate compartment further comprises a first and second plane, said first plane extending from said substantially radially extending leading side wall substantially parallel to said filter surface and said second plane being tapered by extending from said first plane toward said filter surface.

3. The filter cylinder of claim 1, additionally comprising a shaft co-extensive with said axis and a plurality of filtrate tubes communicating with said compartments in the vicinity of said leading side wall; and wherein the distance between said bottom part of said filtrate compartments and said shaft decreases in the direction of said filtrate tubes.

4. The filter cylinder of claim 1, wherein said leading side wall has a height; and wherein said protrusion extends towards said bottom part for a distance less than said height.

5. The filter cylinder of claim 1, wherein said compartment additionally comprises an opening facing said filter surface and a trailing side wall; said protrusion having an axially extending edge spaced from said filter surface; and wherein the distance between said edge and said trailing side wall defining said opening of said compartment and the distance between said leading side wall and said trailing side wall is less than 1:4.

* * * * *